United States Patent

Chester et al.

[15] 3,649,867

[45] Mar. 14, 1972

[54] IMAGE DISPLAY DEVICE UTILIZING A TARGET COMPOSED OF DISCRETE PHOSPHORS

[72] Inventors: Arthur N. Chester, Murray Hill; Dawon Kahng, Bridgewater Township, Somerset County; Bernard B. Kosicki, New Providence, all of N.J.

[73] Assignee: Bell Telephone Laboratories, Incorporated, Murray Hill, N.J.

[22] Filed: June 6, 1969

[21] Appl. No.: 831,083

[52] U.S. Cl. ....................315/12, 313/92

[51] Int. Cl. ....................H01j 29/41

[58] Field of Search ....................315/10, 12, 21; 313/92

[56] References Cited

UNITED STATES PATENTS 2,806,899 9/1957 Zworykin ....................315/12 X 2,861,206 11/1958 Fiore ....................313/92 X 2,875,875 2/1959 Kruper ....................315/21

3,360,674 12/1967 Mikus ....................313/92 X

*Primary Examiner*—Rodney D. Bennett, Jr.

*Assistant Examiner*—J. M. Potenza

*Attorney*—R. J. Guenther and Arthur J. Torsiglieri

[57] ABSTRACT

The specification describes a single-gun television receiving tube in which color selection is obtained by direct modulation of the phosphor target. Associated with the three-color array of phosphors is an electrode grid which enables all phosphor regions of one color to be exposed simultaneously to an electric field. Via a field quenching mechanism emission from those regions selectively exposed to the field is prevented while the phosphor regions for the color corresponding to the input information emit.

8 Claims, 3 Drawing Figures

INVENTORS A. N. CHESTER
D. KAHNG
B. B. KOSICKI
BY
ATTORNEY

IMAGE DISPLAY DEVICE UTILIZING A TARGET COMPOSED OF DISCRETE PHOSPHORS

This invention relates to an improved electro-optic conversion tube for displaying light images.

Conventional devices for displaying light images such as television receiver tubes rely on the light-producing effect of a modulated electron beam scanning a cathodoluminescent target. In such a system it is vital that the modulation signal be closely synchronized with the scanning signals. When a color signal is added it becomes necessary to maintain this synchronization with the added requirement of precise physical alignment between the electron beam and the appropriate series of color dots on the tube face. With the realization that three such electron beams must function simultaneously in this fashion, the enormous complexity of the existing commercial version of the television receiver tube can be appreciated.

Efforts to reduce the complexity of the tube and increase its reliability have been intense and most often directed toward producing a single electron gun tube for displaying color images.

One of these efforts, which has been developed to a commercial embodiment, relies on bending the electron beam so as to impinge on the target at an angle. The incident angle determines which of the three color dots the beam will strike. Again, this requires critical physical alignment of the beam and the target. It would be desirable to have the color selection process independent of the electron beam. This would eliminate the need for exacting physical alignment between the beam and the target.

These advantages are at least partially obtainable in the image display device of the invention. In this device the target is composed of discrete regions of three color phosphors in juxtaposition as in a conventional tube. However, in contrast with the operation of the conventional tube, the single beam sequentially scans all three color phosphors while the color selection process is independently carried out. The latter is achieved by locally applying a field to all regions of one color so that the luminescent process in those regions is preferentially modulated. If the regions representing two colors are simultaneously quenched by the field only one color will emit. By this means, color selection is made independent of the scanning beam through the application of localized fields directly to the target. The field is selectively applied simultaneously to all phosphor dots of a given color through a grid of electrodes associated with each group of phosphor color regions. Color intensity information is supplied by modulating the cathode-target voltage in the usual manner.

Various modes of operation are possible using the concept just described. For example, the color intensity information can be transmitted in time division with each division corresponding to a frame period. The appropriate phosphor region is switched on by removing its quenching field and a single color image is produced. The remaining two color images follow in sequence. The inability of the eye to discern changes over a frame period permits an apparent reconstitution of the image in full color. The use of time division in transmitting color television signals is well known and the inability of the eye to resolve the color of a single frame has been established. The aesthetic appeal of images formed using this system is indistinguishable from that formed by simultaneous activation of three color phosphors.

The isolation of the color selection process from the electron beam effects dramatic changes in the tube. The shadow mask is eliminated. Errors in beam deflection due to inherent tube defects or due to spurious magnetic fields are no longer of consequence. The converging lens, and the dynamic focusing deflection circuits associated with it, are unnecessary. The target face requires division between color regions only in the plane normal to the beam scanning direction. Thus stripes may be substituted for the dot trios in conventional use. It is however necessary to have precise registration between the phosphor regions and their associated electrical contacts so as to permit the controlled application of localized fields.

The mechanism for modulation of the target independent of the beam relies on a field-quenching phenomenon whereby a phosphor exposed to an electric field is rendered incapable of luminescence.

To obtain efficient field quenching it has been found desirable to isolate the phosphor from direct incidence of the electron beam. If the electron beam falls directly on the phosphor, the penetration depth of electrons is usually too large to effect efficient field modulation of luminescence. To overcome this, the phosphor is photon coupled to the electron beam so that the visible display is produced by secondary photon emission. Structurally this means that an ultraviolet cathodoluminescent coating is interspersed between the phosphor and the beam so as to absorb the bulk of the bean electrons.

If the photon coupling mechanism relies on ultraviolet photons, the cathodoluminescent coating is a UV emitting phosphor and visible display phosphor is a UV excited photoluminescent phosphor. The UV coupling mechanism appears to be most practical at present although other possibilities exist.

From the foregoing general discussion it is evident that the separation of the color selection function from the electron beam drastically changes the design characteristics of the television receiving tube. The simple, economic construction made possible by the use of directly modulating the target to obtain the color selection function may represent a considerable advance in the art.

The invention is set forth in greater detail in the following specific description.

Figure 1:
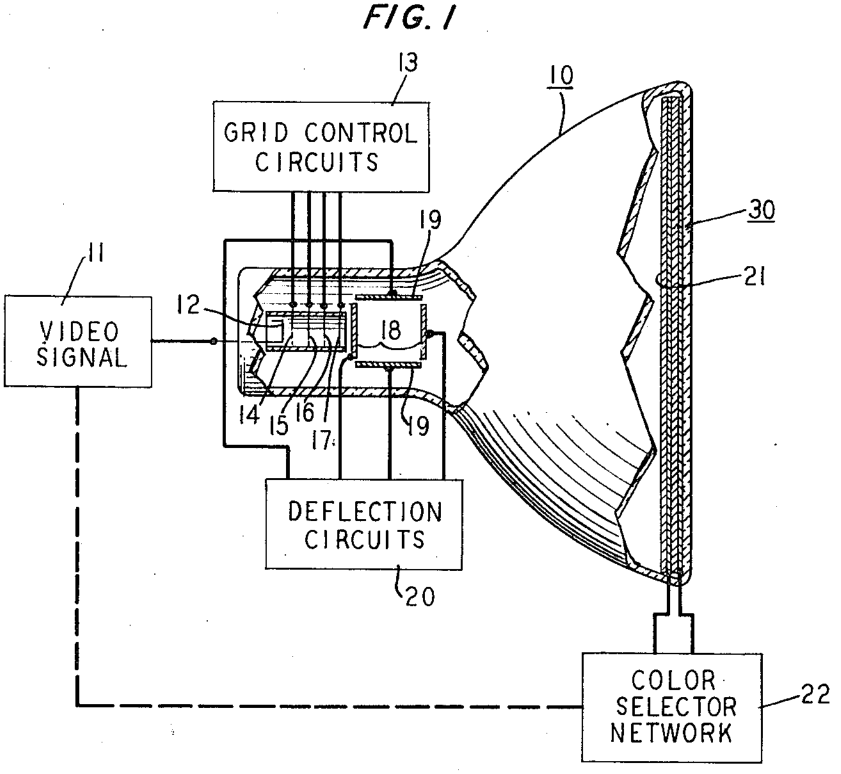
FIG. 1 is a schematic view of a receiving tube having conventional components except for the target.

The receiving tube 10 of FIG. 1 employs a standard cathode-ray gun in which, in an exemplary embodiment, the video signal 11 is impressed on the control grids associated with grid control circuits 13. These circuits appropriately bias grids 14–17 for beam brightness control, focus and acceleration in the conventional manner. X–Y deflectors 18 and 19 are operated by deflection circuits 20 to provide the usual horizontal raster. The target 21 embodies the principles of the invention to control the color selection process. This is accomplished by a switching network 22 which is synchronized with the video signal 11.

Figure 2A:
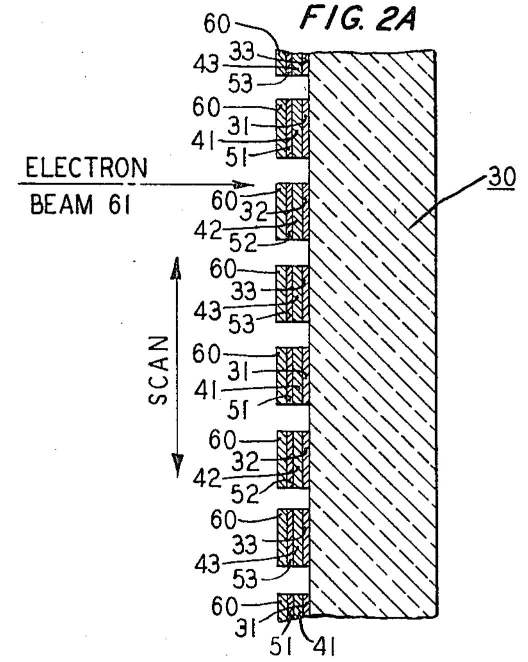
FIG. 2A is a plan view, in section, of one embodiment of a target embodying the principles of the invention.
Figure 2B:
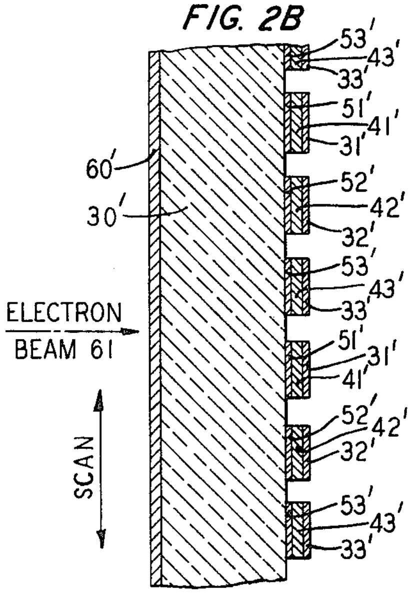
FIG. 2B is a view similar to FIG. 2A illustrating an alternative embodiment.

The target 21 is shown in detail in the embodiments of FIGS. 2A and 2B.

In the embodiment of FIG. 2A the target is shown in a sectional plan view. This view represents only a small region of the target. The tube face 30 is the conventional glass envelope. Deposited on the inside of the tube face are a series of electrode strips 31, 32, and 33 each of which extends over the height dimension of the tube. Although the electrode strips are identical they are grouped in three groups, each group representing one of the three conventional phosphor colors. Each group shares a common electrode so that all electrode strips associated with a given color phosphor can be simultaneously electrically energized. The phosphors associated with these strips are shown at 41, 42 and 43. Counter electrodes 51, 52 and 53 are applied to form a "sandwich" structure with the phosphor disposed between metal film electrodes. To confine the application of the field to those sandwich structures having a common phosphor color either or both electrodes 31 and 51 must be connected to a common terminal, likewise with electrodes 32 and 52, and 33 and 53. In each case however one electrode can be a common ground. Accordingly if electrodes 51 to 53 are segregated, electrodes 31 to 33 can comprise a continuous electrode film. In the same way electrodes 51 to 53 may comprise one continuous electrode although the particular structure of FIG. 2A does not admit of this.

Each phosphor sandwich is then covered with a cathodoluminescent phosphor 60 to provide separation between the electron beam and the visible phosphors. This layer is common to all of the strips. The electron beam, which scans in the direction indicated, is shown schematically by arrow 61. It should be pointed out that FIG. 2A describes the essential elements of the structure. Various procedures for fabricating this or equivalent structures will occur to those skilled in the art.

The target functions via the quenching mechanism described above. As an illustrative embodiment, the following specific structure is suggested.

The glass envelope 30 is a standard vacuum tube envelope. The electrodes 31–33 can be any conductive material which is largely transparent to the emitting wavelength of the visible phosphors, e.g., $SnO_2$. The thickness may be a few tenths of a micron to 20 microns or more depending upon the resolution and absorption tolerances. The visible emitting phosphors 41–43 are conventional red, green and blue phosphors. Exemplary materials are: red — $YVO_4$:Eu, green — ZnCdS:Ag, blue — ZnS:Ag. All of these can be activated by ultraviolet energy, a property common to most conventional phosphors. The thickness of the phosphor coatings is conventional, e.g., 5 to 100$\mu$. The counter electrodes 51–53 must be transparent to ultraviolet light. A thin (0.1 to 0.5$\mu$) silver film is adequate for this purpose (silver has a "window" at 3.8 e.v.). Also $SnO_2$ could be used. A useful ultraviolet emitting phosphor for layer 60 is gadolinium-doped yttrium oxide (1 to 10 mol % Gd). This material emits efficiently at 3,100 A. A film thickness in the range of 5 to 50$\mu$ will have an adequate cross section to capture 10 to 20kv. electrons. The quenching field necessary to give a visible-light modulation ratio of 10 to 1 is of the order of $10^4$ volts/cm., or 1 volt per micron of phosphor thickness.

An alternative embodiment that is functionally very similar to that of FIG. 2A is shown in FIG. 2B. In FIG. 2B the elements with primed numbers correspond directly to their unprimed counterparts in FIG. 2A. A significant distinction between the two structures is the physical separation of the two phosphor coatings by the glass faceplate 30'. This has beneficial implications in the processing of the target. For example the processes for depositing the UV and visible phosphors can be totally independent. The UV phosphor can be deposited in a continuous layer. For good resolution it may be advantageous to limit the thickness of the faceplate 30' or to provide a separate faceplate for physical protection of the tube. It is evident that the electrical separation of the visible phosphor from the electron beam, which is an important feature of this structure, is especially complete in this embodiment. It may be that the thermal separation inherent in this arrangement is important also. The suggestion made above that this target structure be independent of the faceplate suggests that the sandwich structure containing the visible phosphor can be made independently of the faceplate 30' and its associated phosphor 60'. For example a plastic film carrying the array of visible phosphors can be separately fabricated and then applied to the faceplate 30'.

It should be pointed out that the image display device described above has the added feature of being operable in a black and white mode and thus satisfies the compatability requirement of current video receivers.

What is claimed is:

1. A color image display device comprising an evacuated envelope, a phosphor screen disposed within said envelope, means for forming an electron beam adapted to scan the phosphor screen, the phosphor screen comprising a monolithic array of discrete photosensitive visible phosphors substantially covering the screen, the discrete phosphors emitting at more than one visible wavelength so as to permit the formation of a multicolored image, electrode means associated with each discrete phosphor for exposing that phosphor to an electric field, the electrode means comprising an electrode array in which the electrodes associated with phosphors emitting at one wavelength are connected together while the electrodes associated with phosphors emitting at another wavelength are connected together so that the phosphors emitting at a common wavelength can be selectively exposed to an electric field, and a cathodoluminescent phosphor adjacent to the visible phosphors, the cathodoluminescent phosphor comprising a material emitting at a wavelength capable of activating the visible phosphor.

2. The display device of claim 1 wherein a transparent substrate is interposed between the visible phosphors and their associated electrode means, and the cathodoluminescent phosphor.

3. The device of claim 1 wherein the cathodoluminescent phosphor emits in the ultraviolet.

4. The display device of claim 3 wherein the cathodoluminescent phosphor comprises yttrium oxide doped with 1 to 10 % gadolinium.

5. The display device of claim 1 wherein the thickness of the visible phosphor coatings is in the range of 5 to 100$\mu$.

6. The display device of claim 4 further including means associated with the electrode means for selectively applying a field of the order of 5 to 100 volts to the visible phosphors.

7. The device of claim 1 wherein the visible phosphors emitting at more than one wavelength comprise red-, green-, and blue-emitting phosphors.

8. The device of claim 7 wherein the visible phosphors comprise $YVO_4$:Eu, ZnCdS:Ag, and ZnS:Ag.

* * * * *